(12) United States Patent
Tulloch (10) Patent No.: US 10,081,984 B2
(45) Date of Patent: Sep. 25, 2018

(54) DOWNHOLE MOTOR, DRILL STRING PROVIDED WITH SUCH A MOTOR AND METHOD OF RELEASING A STUCK DRILL BIT ATTACHED TO SUCH A MOTOR

(71) Applicant: NOV DOWNHOLE EURASIA LIMITED, Gloucestershire (GB)

(72) Inventor: Rory McCrae Tulloch, Aberdeen (GB)

(73) Assignee: NOV Downhole Eurasia Limited (GB)

( * ) Notice: Subject to any disclaimer, the term of this patent is extended or adjusted under 35 U.S.C. 154(b) by 0 days.

(21) Appl. No.: 15/526,722

(22) PCT Filed: Nov. 11, 2015

(86) PCT No.: PCT/GB2015/053409
§ 371 (c)(1),
(2) Date: May 12, 2017

(87) PCT Pub. No.: WO2016/075456
PCT Pub. Date: May 19, 2016

(65) Prior Publication Data
US 2017/0306699 A1    Oct. 26, 2017

(30) Foreign Application Priority Data
Nov. 12, 2014    (GB) .................................. 1420119.8

(51) Int. Cl.
*E21B 4/02*    (2006.01)
*E21B 4/10*    (2006.01)
(Continued)

(52) U.S. Cl.
CPC .................. *E21B 4/02* (2013.01); *E21B 4/10* (2013.01); *F16D 41/14* (2013.01); *E21B 4/06* (2013.01); *E21B 31/00* (2013.01)

(58) Field of Classification Search
CPC ...... E21B 4/02; E21B 4/05; E21B 4/10; E21B 31/00; F16D 41/12; F16D 41/14
See application file for complete search history.

(56) References Cited

U.S. PATENT DOCUMENTS 2,143,121 A * 1/1939 Cox ..................... F16D 41/12
                                                       180/6.2
4,253,532 A    3/1981 Geczy
(Continued)

OTHER PUBLICATIONS

International Search Report dated Apr. 18, 2016 for iInternational Application No. PCT/GB2015/053409.

*Primary Examiner* — D. Andrews
*Assistant Examiner* — Yanick A Akaragwe
(74) *Attorney, Agent, or Firm* — Conley Rose, P.C.

(57) ABSTRACT

A downhole motor (107) which comprises a stator housing (108), a rotor assembly (106) rotatable relative to said stator housing, and an arrangement for enabling, in use, a drill bit connected to the rotor assembly of said downhole motor to be rotated by rotating a drill string connected to said stator housing, wherein said arrangement comprises a unidirectional clutch (117) disposed between said rotor assembly and said stator housing and having at least one pawl which can be displaced between an inoperative position adjacent said stator housing and an operative position in which rotation of said stator housing by said drill string in one sense is transmitted to said rotor assembly via said at least one pawl, means biasing said at least one pawl towards said operative position, means retaining said at least one pawl in its inoperative position, and means which, when sufficient pulling force is applied to said drill string, will cause said means retaining said at least one pawl to release said at least one pawl and enable said at least one pawl to move into its operative position.

11 Claims, 12 Drawing Sheets

(51) Int. Cl.
*F16D 41/14* (2006.01)
*E21B 4/06* (2006.01)
*E21B 31/00* (2006.01)

(56) References Cited

U.S. PATENT DOCUMENTS

| | | |
|---|---|---|
| 4,386,666 A | 6/1983 | Crase |
| 5,551,510 A | 9/1996 | Mills |
| 7,735,581 B2 | 5/2010 | Underwood |
| 8,561,692 B1 * | 10/2013 | Schultz .................. E21B 17/06 |
| | | 166/242.6 |
| 2015/0240569 A1 * | 8/2015 | Downie .................. E21B 4/02 |
| | | 192/45.1 |

* cited by examiner

DOWNHOLE MOTOR, DRILL STRING PROVIDED WITH SUCH A MOTOR AND METHOD OF RELEASING A STUCK DRILL BIT ATTACHED TO SUCH A MOTOR

CROSS-REFERENCE TO RELATED APPLICATIONS

This application is a 35 U.S.C. § 371 national stage application of PCT/GB2015/053409 filed Nov. 11, 2015, entitled "Downhole Motor, Drill String Provided with Such a Motor and Method of Releasing a Stuck Drill Bit Attached to Such a Motor," which claims priority to U.K. application No. GB 1420119.8 filed Nov. 12, 2014, both of which are incorporated herein by reference in their entirety for all purposes.

This invention relates to a downhole motor.

During the construction of conventional oil and gas wells well bores are normally drilled by rotating a drill bit by a drill string which is rotated by a top drive or Kelly drive at the surface.

It is desirable to be able to drill well bores which extend both downwardly and outwardly in a desired direction from a fixed location.

In order to assist in the construction of such well bores, downhole motors have long been used with the first turbo-drill design going back to 1924 in the Soviet Union. Downhole motors are typically positioned at or close to the end of a drill string in a Bottom Hole Assembly immediately upstream of the drill bit. In use, drilling mud is circulated through the drill string, to the bottom of the drill string, through the downhole motor and back through an annulus defined between the outer surface of drill pipe and the hole being bored. The drilling mud carries drill cuttings back to the surface in the annulus. The drilling mud also serves a number of other functions such as maintaining pressure in the bore to inhibit collapse or ingress of gases or liquids from the surrounding rock formations. The flow of drilling mud through the downhole motor rotates a rotor which rotates the drill bit. The section of the drill string between the surface and the downhole motor does not normally rotate whilst the downhole motor is operating in directional mode, although it may rotate in certain circumstances such as drilling straight ahead at a slower speed (eg 60-150 rpm) than the downhole motor.

A MWD (Measurement While Drilling) unit is often connected in the drill string immediately upstream of the downhole motor and, in use, sends signals to the surface which give the driller, inter alia, the exact position (ie depth, inclination and azimuth) of the drill bit and the tool face reading of the direction that the bit is being pointed in or pushed towards. Depending on the nature of the equipment being used and other ancillary equipment which may be in the drill string the driller can then send signals downhole to cause the drill bit to drill in a desired direction, but this type of system is normally used with a programmable rotary steerable tool which can respond to change the tool face as required. Downhole motors normally use bent housings and are manipulated from the surface by rotation to point the bent housing in the desired direction which is controlled using the MWD readings.

Whilst this arrangement normally works well, once in a while, the drill bit becomes stuck. Depending on the type of downhole motor being used the driller will be alerted to this problem by different signals. However, in all cases the ultimate signal is that the drill string at the surface does not progress downhole and the bit cannot be lifted back uphole, such as pulling off bottom to check that the motor has not stalled out.

Typically, a drilling jar will be incorporated in the drill string, as part of the Bottom Hole Assembly upstream of the MWD section to help free a stuck drill bit or stuck stabiliser. A safety joint may also be incorporated into the drill string to enable the drill string above the safety joint to be recovered whilst leaving the stuck drill bit and/or stuck stabilisers above the drill-bit and everything downstream of the safety joint downhole should it not be possible to free the drill bit and/or stabilisers.

The first step when trying to release a stuck drill bit is to try and withdraw the drill bit by pulling the drill string back using the drawworks. The amount of force which can be applied is usually limited by the components in the drill string.

If this does not work then the next step is usually to use the drilling jar. When activated, for example by generating more than a certain amount of tension in the drill string by trying to withdraw the drill string, the jar generates an impulse which is transmitted to the drill bit and will hopefully free it. Certain types of drilling jars can be reset and the process repeated multiple times.

If this fails then, until recently, the only option was to apply reverse torque to the drill string which would cause the drill string to part at a safety joint (typically a joint designed to be unscrewed at a lower torque than all the other tubulars in the drill string). The drill string above the safety joint could be recovered but the drill bit, downhole motor and MWD section would typically be left downhole where they might be the subject of a fishing trip but, in some cases, would end up being entombed in cement pumped downhole when the lower assembly was found not to be fishable by normal means and the hole continued using a whipstock to redirect the wellbore and bypass the now entombed equipment.

Downhole motors typically comprise a stator housing and a rotor assembly which is rotatable relative thereto. The rotor assembly is connected to the drill bit either directly or via a gear box (as in some turbodrills) whilst the housing is connected to the drill string typically via an MWD.

The torque applied to a drill bit by a downhole motor depends on the particular type and construction of the downhole motor. Turbodrills, for example the Neyrfor Turbodrills currently being offered by Schlumberger, are being increasingly used. These can often be over 10 meters in length. In use they typically free run at over 1000 rpm at normal drilling flow rates. As mentioned above, the rotor assembly of some downhole motors are directly connected to drill bits whilst others are connected to a drill bit via a gear box as in some turbodrills. Regardless of their construction, the torque which a downhole motor can apply to a drill bit is typically relatively low compared with the torque which could be transmitted to the drill bit via a top drive or rotary table in a convention vertical well in normal use.

Various devices for enabling torque applied to the drill string to be applied to the rotor assembly or directly to the motor output shaft with a view to freeing a stuck drill bit have been proposed.

U.S. Pat. No. 7,735,581 discloses an arrangement which enables torque applied to the drill string to be applied to the rotor when the drill bit stalls. The problem with this arrangement is that, during normal use, the arrangement is continually subject to wear and may be worn out by the time it is needed.

GB 2 378 197 shows an arrangement which does not suffer from this problem. The arrangement includes a member which is connected to the drill string by a shear pin. If the drill bit becomes stuck and cannot be released by pulling at a particular level and jarring the string is pulled back at a higher level until the shear pin fails at which time the member, which is slidable with respect to the drill string but non-rotatable relative thereto, is free to be advanced into driving engagement with the rotor of the downhole motor by hydraulic pressure. Once driving engagement is initiated the downhole motor cannot be operated to rotate the drill bit independently of rotation of the drill string.

The inventor has observed that, whilst a large number of well bore devices are actuated consistently and reliably by applying hydraulic pressure, unexpected and undesirable conditions can and do occur in unwanted circumstances, for example when a drill bit becomes stuck in a zone in which drilling mud pressure is lost to a porous formation or the like.

The present invention provides a downhole motor which comprises a stator housing, a rotor assembly rotatable relative to said stator housing, and an arrangement for enabling, in use, a drill bit connected to the rotor assembly of said downhole motor to be rotated by rotating a drill string connected to said stator housing, characterized in that said arrangement comprises a unidirectional clutch disposed between said rotor assembly and said stator housing and having at least one pawl which can be displaced between an inoperative position adjacent said stator housing and an operative position in which rotation of said stator housing by said drill string in one sense is transmitted to said rotor assembly via said at least one pawl, means biasing said at least one pawl towards said operative position, means retaining said at least one pawl in its inoperative position, and means which, when sufficient pulling force is applied to said drill string, will cause said means retaining said at least one pawl to release said at least one pawl and enable said at least one pawl to move into its operative position.

Preferably, said at least one pawl is pivotally mounted.

Advantageously, said unidirectional clutch comprises an annular mounting block which is disposed circumjacent said rotor assembly.

Preferably, said at least one pawl is pivotally mounted on said annular mounting block.

Advantageously, said means biasing said at least one pawl towards said operative position comprises at least one spring which is preferably a torsion spring arranged to act between said at least one pawl and at least one of said annular mounting block and said stator housing. Other suitable means biasing said at least one pawl towards said operative position could comprise, for example a leaf spring and/or a coil spring.

The means retaining said at least one pawl in its inoperative position could conveniently comprise a retaining pin.

Advantageously said retaining pin is mounted on a carriage which can be moved relative to said housing to displace said retaining pin and allow said at least one pawl to move into its operative position.

Preferably, said carriage is held in a position in which said means retains said at least one pawl in its inoperative position by a shear member which can be sheared to allow movement of said carriage when said sufficient force is applied to said drill string.

Advantageously said unidirectional clutch is a sprag clutch.

The present invention also provides a drill string provided with a downhole motor in accordance with the present invention supplemented, optionally, by one or more jars and/or a safety joint.

The present invention also provides a method of releasing a stuck drill bit attached to the rotor assembly of a downhole motor in accordance with the present invention the stator housing of which is attached to a drill string, which method comprises the steps of:

(i) applying sufficient pulling force to said drill string to cause said means retaining said at least one pawl in its inoperative position to release said at least one pawl and enable said at least one pawl to move into its operative position; and (ii) rotating said drill string in a sense to rotate said rotor assembly and said drill bit via said at least one pawl.

For a better understanding of the present invention and to show how the same may be carried into effect reference will now be made, by way of example, to the accompanying drawings in which.

Figure 1:
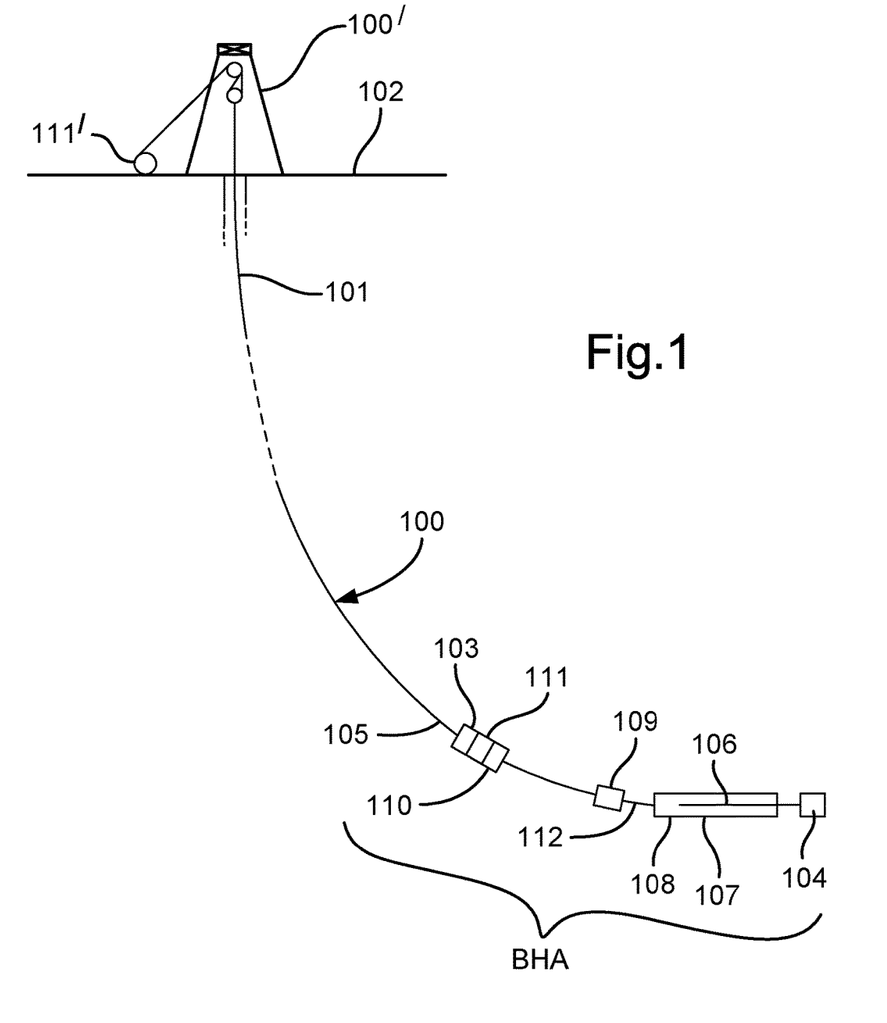
FIG. 1 is a schematic side elevation of a drilling rig with a drill string incorporating a downhole motor in accordance with the present invention.

Referring to FIG. 1 of the drawings there is shown a drill string which is generally identified by the reference numeral 100.

The drill string 100 comprises a multiplicity of joints of drill pipe 101 which extend downwardly from the surface 102. The drill string 100 is provided with a Bottom Hole Assembly BHA at its lower end. The BHA includes a number of items including a plurality of drill collars 103 which are relatively heavy and help keep the joints of drill pipe 101 in tension and help apply weight on a drill bit 104. There may be a plurality of heavy weight drill pipes 105 between the drill-collars/BHA and the standard drill-pipe to surface but HWDP is not always used.

A drill bit 104 is connected to a rotor assembly 106 of a downhole motor 107 which may be of the type known as a turbodrill which has a stator housing 108 which is in fixed relation to the drill string and is also known as a stator. The downhole motor 107 is connected to a Measurement While Drilling (MWD) unit 109 which is connected to the stator housing 108 by a sub 112.

A drilling jar 110 and a safety joint 111 are typically positioned amongst the drill collars 103. The exact positioning of the safety joint 111 and the drilling jar 110 in the drill string 100 is normally dictated by specialist drilling engineers in accordance with the drilling conditions and equipment being used but generally the safety joint 111 should be positioned so that as much of the BHA is recovered out of hole in the event a back off of the safety joint 111 has to be done if the jar activation does not free the stuck-bit.

In use, mud is pumped from drilling rig down through the drill string 100 through the downhole motor 107 and causes the rotor assembly 106 to rotate and thus rotate the drill bit 104 which penetrates the formation at a rate which is measured by the rate at which the drill string can be lowered downhole at surface 102 whilst maintaining the desired WOB (Weight On Bit).

Although relatively uncommon, it is possible for the drill bit 104 to become stuck. This is an extremely unwelcome situation. Depending on available sensors, sticking could be detected, for example by a sensor which detects the rotational speed of the rotor assembly 106, but normally it is by noting that the drill string at the surface is not progressing down hole and that there is a high overpull when trying to lift the drill bit 104 off bottom.

When it is thought that the drill bit 104 is stuck the first remedy is to pull up on the drill string 100 using the draw-works 111' at the surface 102.

If this fails the next step is to activate the drilling jar 110 in the hope that one or more impacts induced in the drill string 100 by activation of the drilling jar 110 will free the drill bit 104. Depending on the type of drilling jar used, it may be possible to reset drilling jar 110 and for the jarring to be repeated.

If jarring fails, the next option is to mechanically couple the stator housing 108 and the rotor assembly 106 of the downhole motor 107 and try and rotate the drill bit 104 by rotating the drill string 100 from the surface with the aid of a top drive or a Kelly Drive (not shown) whilst simultaneously pulling upwards. The final resort is to activate the safety joint 111 by applying left-hand torque from surface 102 to unscrew the mid-connection in the safety joint 111 and recover the DP, HWDP and the drill collars 103 above the safety joint 111 leaving the BHA below the safety joint 111 in the hole.

Figure 2:
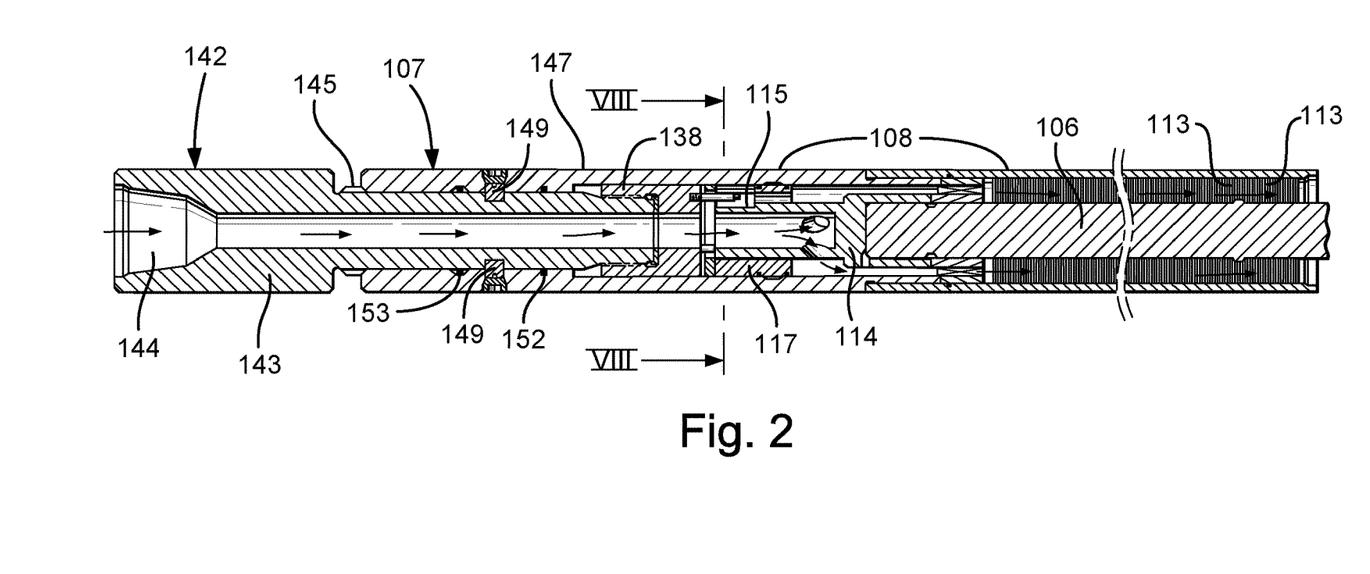
FIG. 2 is a simplified cross-section through part of the downhole motor shown in FIG. 1.

Referring now to FIG. 2, the stator housing 108 of the downhole motor (turbodrill type shown) 107 accommodates the rotor assembly 106 which is supported by spaced bearings (not shown). The stator housing 108 and the outside of the rotor assembly 106 are provided with multiple respective rotor and stator vanes in gap 113 several of which are shown as vertical hatching.

The upstream end of the rotor assembly 106 is provided with a coupling mechanism such as a sprag clutch assembly 117.

The rotor assembly 106 comprises an inlet coupling 114 which is threadedly connected to the rotor assembly 106 so that the inlet coupling 114 and the rotor assembly 106 rotate in concert.

An upstream end of the inlet coupling 114 is provided with three evenly spaced recesses 115 (FIG. 8) which are shaped to accommodate a portion of respective ones of three pawls 116.

Figure 8:
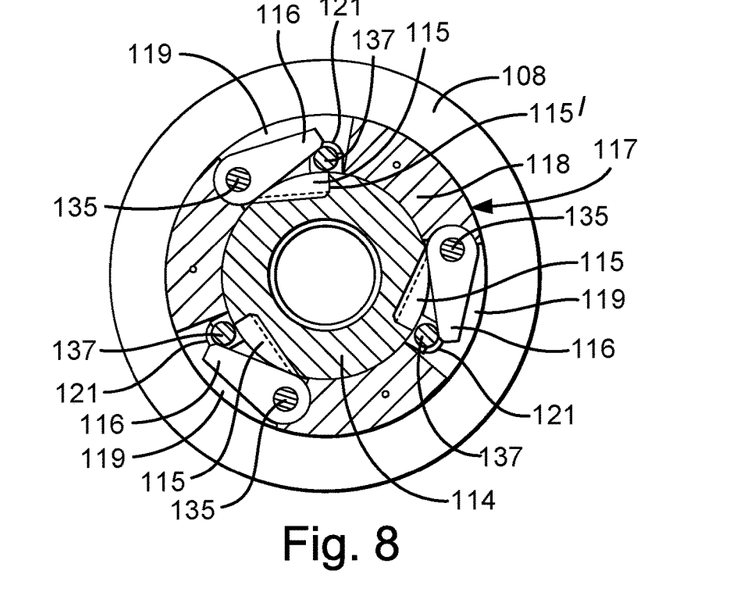
FIG. 8 is a section on line VIII-VIII of FIG. 2.

The sprag clutch assembly 117 also comprises an annular mounting block 118 which is positioned in the stator housing 108 circumjacent the inlet coupling 114 which defines the upstream end of the rotor assembly 106 (FIG. 8).

Figure 3:
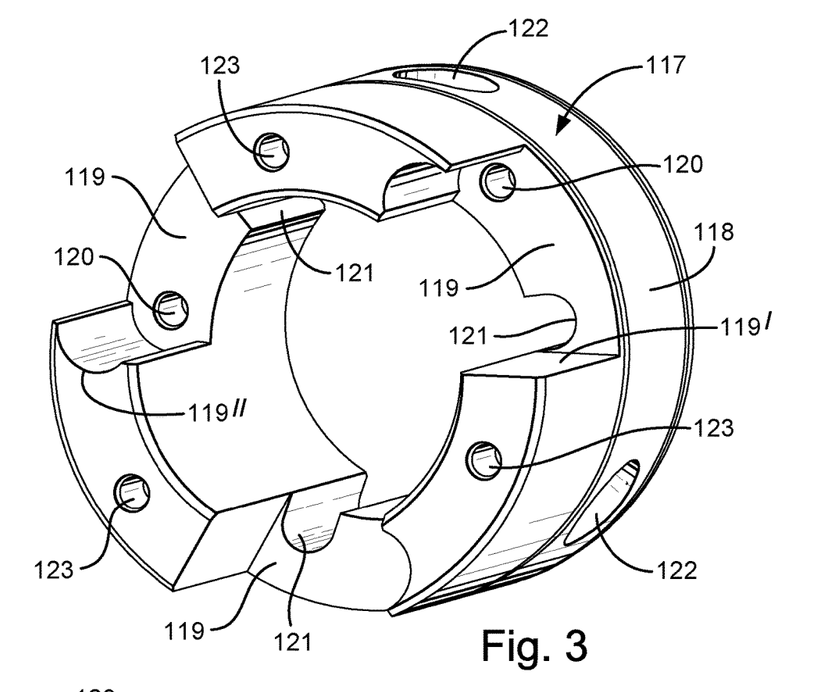
FIG. 3 is a perspective view an annular mounting block forming part of a coupling mechanism of the downhole motor shown in FIG. 2.

As better shown in FIG. 3, the annular mounting block 118 has three cut-outs 119 spaced evenly about an upstream end. Each cut-out 119 has one planar axial surface 119' and one curved axialsurface 119". A threaded axial hole 120 (only two of which are visible in FIG. 3) is provided in the annual mounting block 118 adjacent each curved axialsurface 119".

An inner cylindrical surface of the annular mounting block 118 is provided with three channels 121, each adjacent each planar radial surface 119'. An outer cylindrical surface of the annular mounting block 118 has three locating plug receiving recesses 122. The upstream end face of the annular mounting block 118 has three evenly spaced threaded holes 123 which accommodate socket cap screws 133 (see FIG. 11) which secure a cover plate 124 onto the annular mounting block 118.

Figures 4, 5:
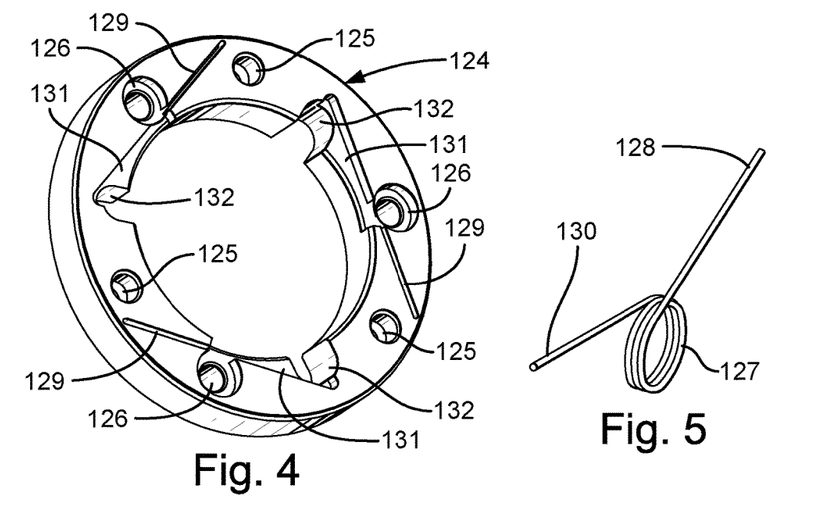
FIG. 4 is a perspective view of a cover plate for the annular mounting block shown in FIG. 3.
FIG. 5 is a perspective view of a torsion spring forming another part of the coupling mechanism of the downhole motor shown in FIG. 2.

FIG. 4 shows the cover plate 124 which is intended to be bolted on to the annular mounting block 118. The cover plate 124 is provided with three axial holes 125 which are intended to align with threaded holes 123 in the annular mounting block 118 when the cover plate 124 is fitted.

The cover plate 124 is also provided with three holes 126 which are counter bored to accommodate a coiled body portion 127 of respective torsion springs 128 one of which is shown in FIG. 5. The cover plate 124 is provided with three channels 129 which each accommodate one end 130 of a respective torsion spring 128 and three cut outs 131 which extend between the holes 126 and respective retaining pin guide channels 132 which align with the channels 121 when the cover plate 124 is mounted on the annular mounting block 118.

Figure 6:
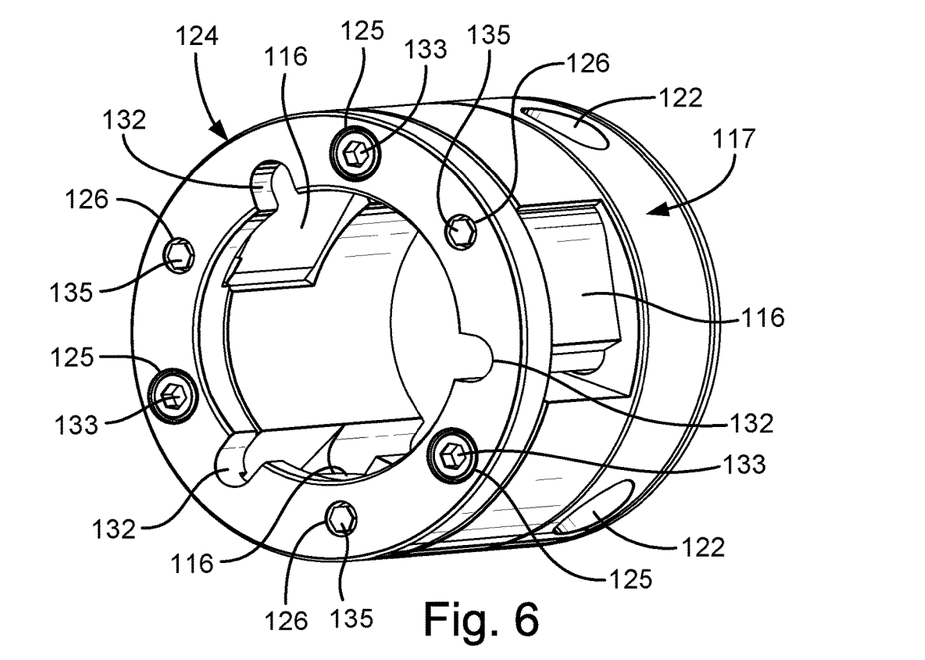
FIG. 6 is a front perspective view of an arrangement incorporating the cover plate shown in FIG. 4 mounted on the annular mounting block shown in FIG. 3 and with pawls fitted and in an inoperative position.

FIG. 6 shows the cover plate 124 mounted on the annular mounting block 118 and secured thereto by three socket cap screws 133 the heads of which are accommodated in counter bores in the axial holes 125.

Three pawls 116 are each pivotally mounted on pivot pins 135 which extend through the holes 126 in the cover plate 124 and are threadedly attached to the threads in the threaded axial holes 120 in the annular mounting plate 118.

Figure 10:
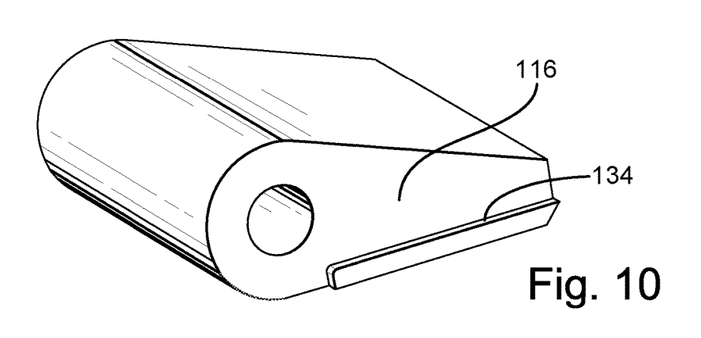
FIG. 10 is a perspective view of a pawl included in the arrangement shown in FIG. 6.

The pawls 116, one of which is shown in FIG. 10, each have a body of generally wedge-shaped of substantially constant cross-section having a curved enlarged end about a bore for receiving the pivot pin 135 the body tapering to a distal end. The body of each pawl 116 has a channel 134 to accommodate the other end of the torsion spring 128. Each pawl 116 is biased inwardly by its respective torsion springs 128. However, in FIGS. 6 and 7 the pawls 116 are shown in their inoperative position which, in reality, they would only occupy when held back by a respective retaining pin 137 as described hereinafter.

Figure 7:
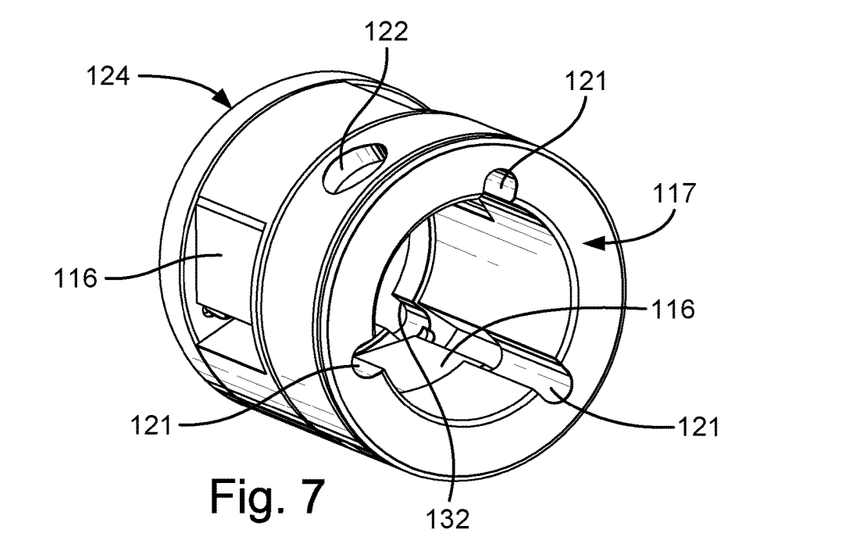
FIG. 7 is rear perspective view of the arrangement shown in FIG. 6.

FIG. 7 shows the alignment of one of the retaining pin guide channel 132 in the cover plate 124 and one of the channels 121 in the annular mounting block 118.

Referring back to FIG. 2, the sprag clutch assembly 117 is disposed circumjacent the upstream end of the inlet coupling 114 which forms the upstream part of the rotor assembly 106. The annular mounting block 118 is secured the stator housing 108 by locating plugs 136 which are threadedly attached to the housing 108 and extend into the locating plug receiving recesses 122 in the annular mounting block 118.

As shown in FIG. 8, the pawls 116, which are biased into their operative position by the torsion springs 128 (not shown in this figure) are held in their inoperative position by respective retaining pins 137 which pass through respective ones of the annular retaining pin guide channels 132 in the cover plate 124 and extend towards the channels 121 in the annular mounting block 118.

Figure 9:
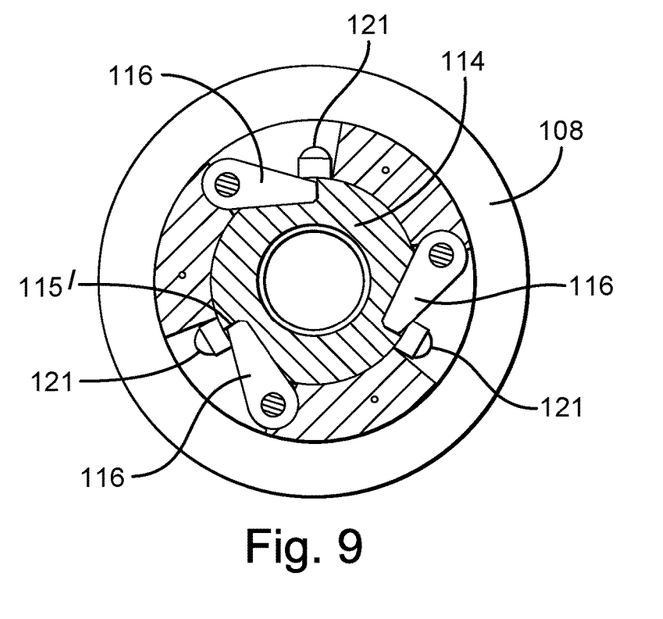
FIG. 9 is a view similar to FIG. 8 but showing the arrangement with retaining pins withdrawn from a locking position.

As can be seen in FIG. 9, after the retaining pins 137 have been withdrawn the pawls 116 are displaced radially inwardly about their respective pivot pin 135 by their respective torsion springs 128 so that the pawls 116 lie in the recesses 115. The distal end of each pawl 116 abuts a shoulder 115' in the recess 115 in the inlet coupling 114. At this stage clockwise (as viewed in FIG. 9) rotation of the stator housing 108 is transmitted to the rotor shaft 106 via its inlet coupling 114.

Figure 11:
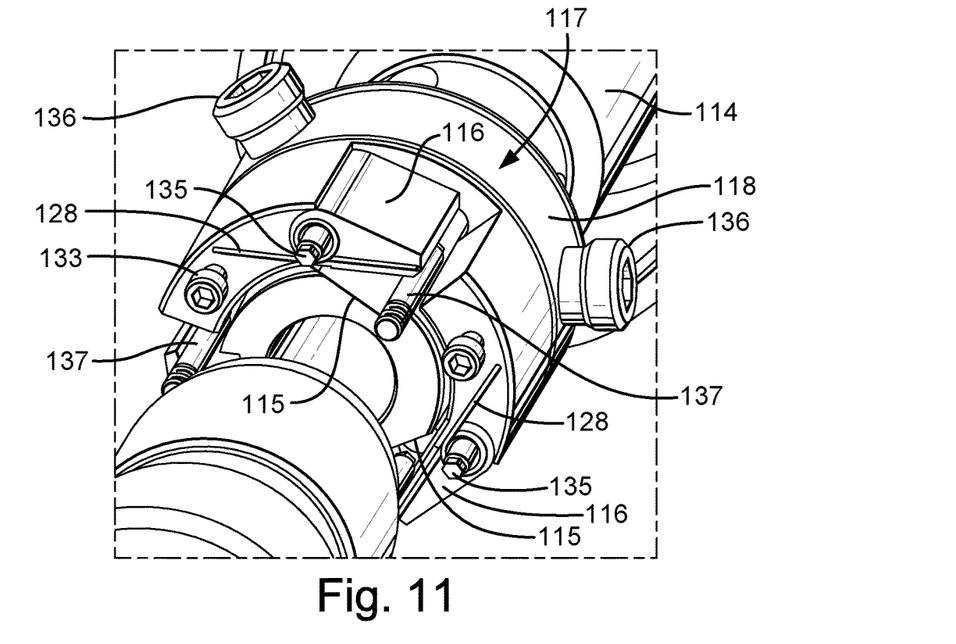
FIG. 11 is a perspective exploded view of part of the downhole motor shown in FIG. 2 showing parts of the coupling mechanism with retaining pins in a locking position.

FIG. 11 is a perspective view which generally corresponds with FIG. 8 except that inter alia the stator housing 108 and cover plate 124 have been omitted for clarity. In this FIG. the retaining pins 137 are shown retaining their respective pawls 116 in their inoperative position.

Figure 12:
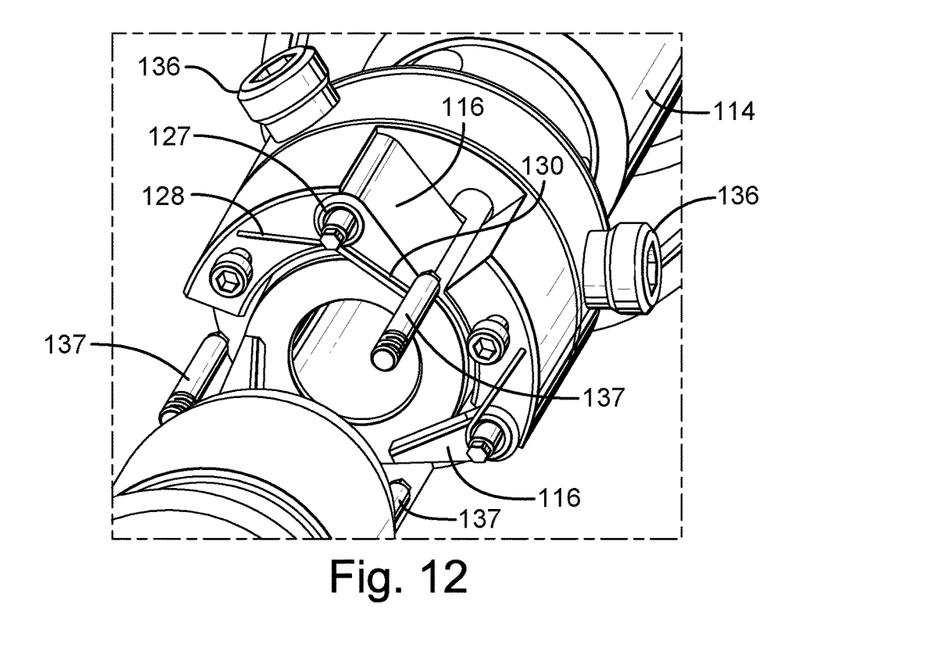
FIG. 12 is a perspective exploded view of the part of the downhole motor shown in FIG. 11 showing the retaining pins withdrawn from their locking position.

In FIG. 12 the retaining pins 137 have been withdrawn to a distance sufficient for the torsion springs 128 to bias their respective pawls 116 into respective recesses 115.

The mechanism for withdrawing the retaining pins 137 will now be described.

As can be generally seen in FIG. 2, the retaining pin withdraw mechanism comprises a carriage 138 and a coupling member 142.

Figure 14:
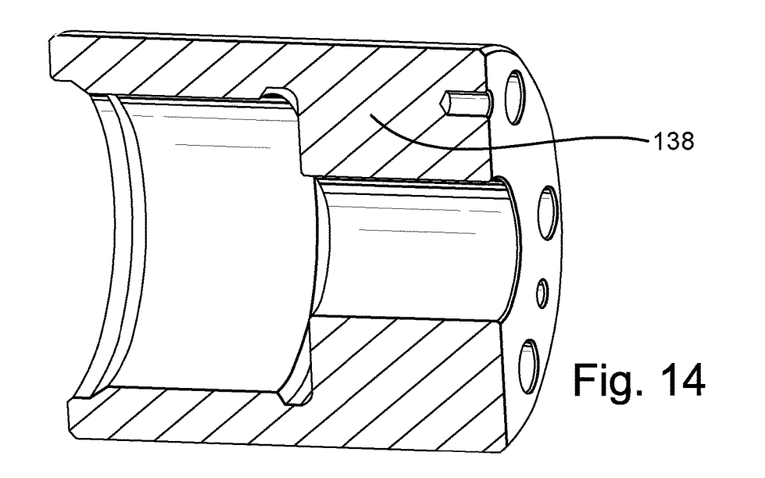
FIG. 14 is a cross section through a carriage forming part of the retaining pin withdraw mechanism shown in FIG. 13.

As better shown in FIG. 14, the carriage 138 is generally annular and the retaining pins 137 are screwed into the downstream face 140 of the carriage 138 which normally terminates closely adjacent the cover plate 124. The retaining pins 137 are located under the distal ends of the pawls 116, allowing the inlet coupling 114 and thus the rotor shaft 106 to rotate freely.

Figure 13:
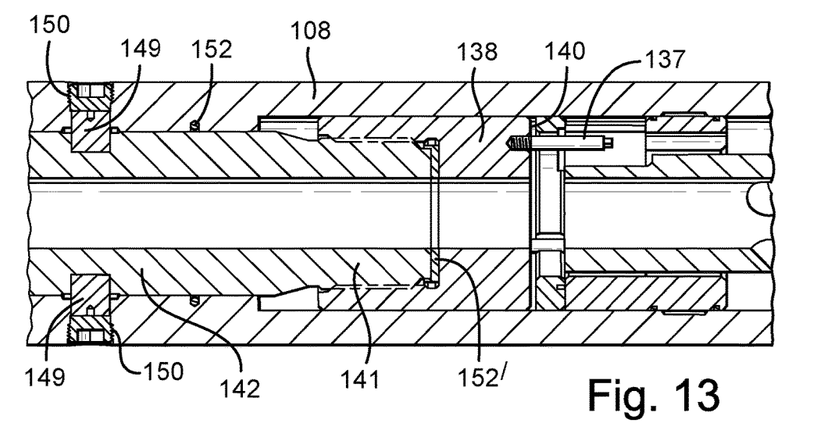
FIG. 13 is a section taken through part of the downhole motor showing a retaining pin withdraw mechanism of the release mechanism.
Figure 13A:
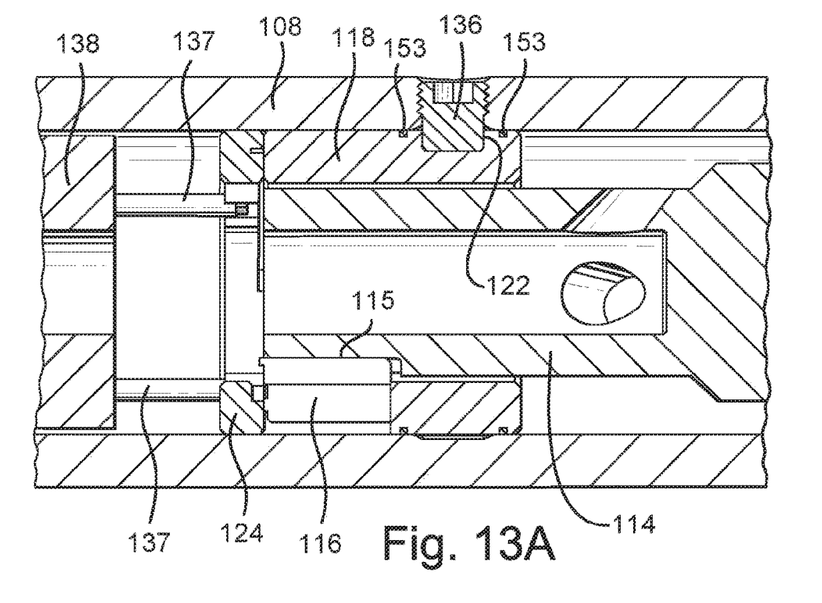
FIG. 13A is a section taken through part of the downhole motor showing a part of the coupling mechanism.

When the carriage 138 is unrestrained, the carriage 138 can be moved to the left as shown in FIG. 13 by a distance sufficient to remove the retaining pins 137 from under the distal ends of the pawls 116, although the free extremities of the retaining pins 137 lie within the retaining pin guide channels 132 in the cover plate 124.

The carriage 138 is counter bored and threaded to accommodate a threaded tip 141 of the coupling member 142 which has an upstream section 143 the upstream extremity of which (FIG. 2) comprises a threaded inlet box 144 which is screwed to sub 112 (FIG. 1).

A seal 152 is provided between an end face of the threaded tip 141 and a face of the counter-bored carriage 138. Two O-rings 153 are located on the annular mounting block 118 and seal either side of the locating plugs 136 which retain the mounting block 118 in the stator housing 108.

Figures 15, 16:
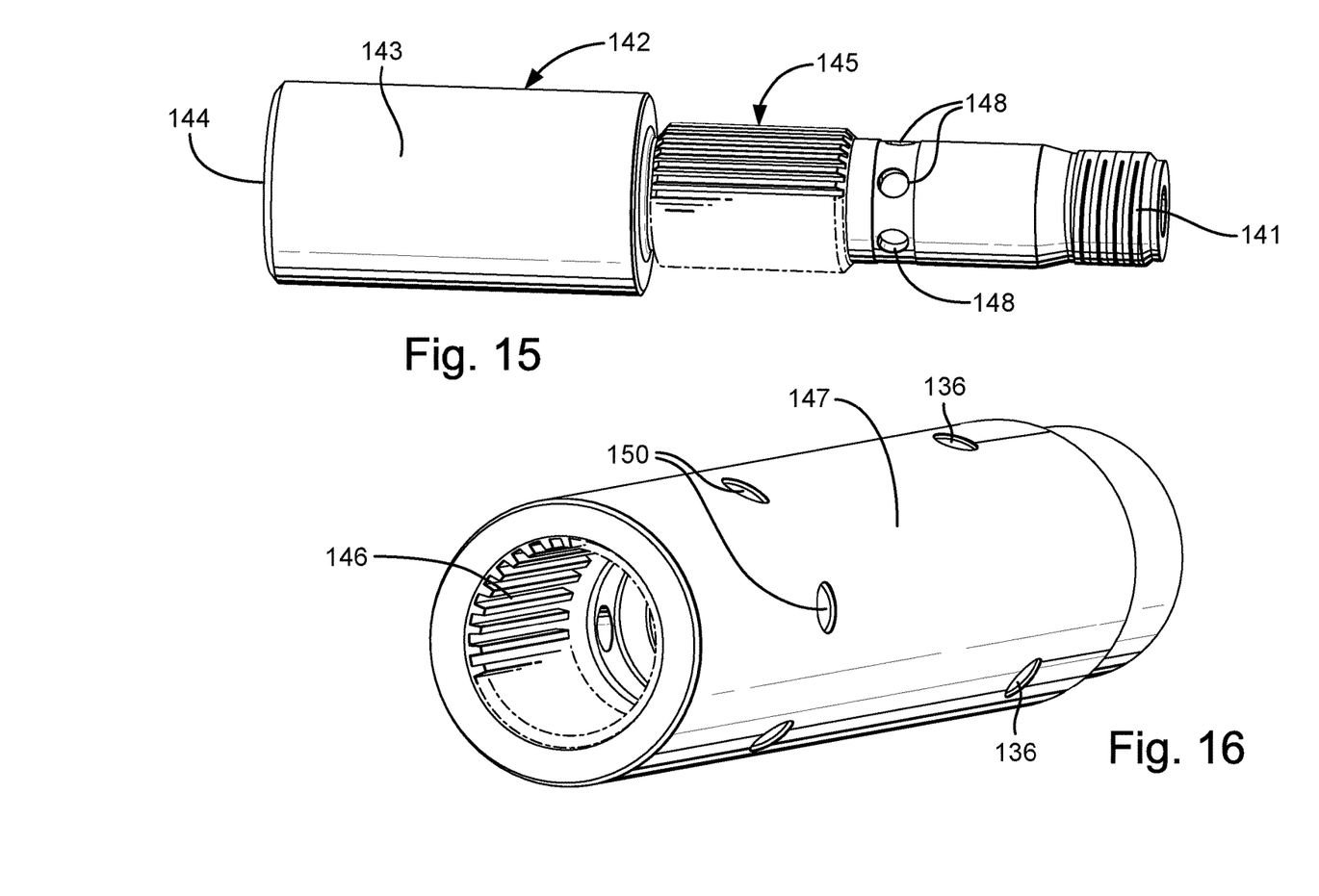
FIG. 15 is a side elevation of a coupling member.
FIG. 16 is a perspective view of an inlet section of the housing of the downhole motor.
Figure 17:
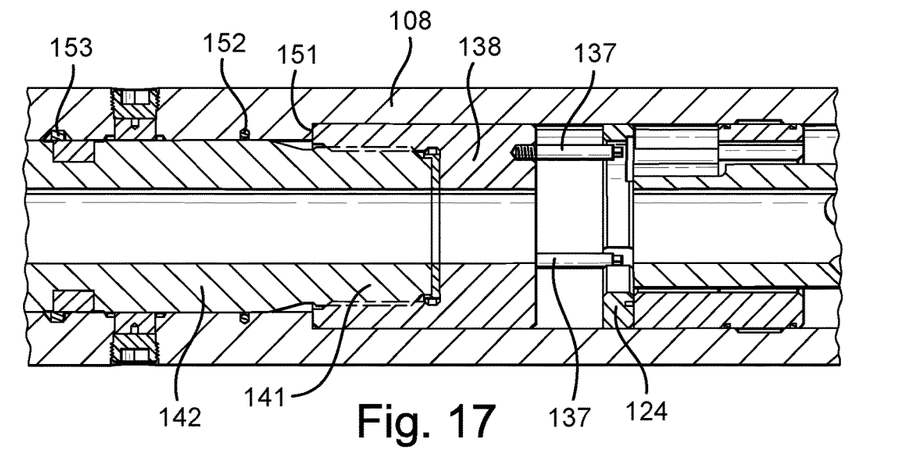
FIG. 17 shows the relative positions of the components shown in FIG. 13 after the shear pins have sheared.

As better shown in FIG. 15, the coupling member 142 has a splined section 145 which engages corresponding splines 146 on the inlet section 147 of the stator housing 108 (see FIG. 16) so that, when unrestrained, the coupling member can move axially with respect to the inlet section 147 of the stator housing 108 but cannot rotate relative thereto in either the restrained or unrestrained axial position Downstream of the splined section 145 is an annular section, which is provided with six blind bores 148 which accommodate the shanks of shear pins 149 which are screwed in threaded bores 150 in the inlet section 147 of the stator housing 108. The six blind bores 148 are arranged circumferentially about the housing, evenly spaced in a single ring.

In normal use, the drill bit 104 is rotated by pumping drilling fluid (usually referred to as 'drilling mud') down the drill string 100 to the downhole motor 107. As the mud passes through the downhole motor 107 it causes the rotor assembly 106, and hence the drill bit 104 to rotate. Every well is different and the exact operating parameters will be determined by the drilling engineer and the driller.

Downhole motor 107 can be run for hundreds of hours without problems. However, once in a while a drill bit 104 will become stuck. If the drill bit 104 can be freed by simply lifting the drill string 100 then drilling can usually be resumed straight away.

If this fails then the driller will normally try to free the drill bit 104 by activating the drilling jar 104. However, if the driller has to use a jar then, even if this succeeds in freeing the drill bit 104, many rig operators will withdraw the entire string, 'trip out' to check that the jarring has not damaged any components in the drill string 100.

Assuming that jarring has not freed the drill bit 104 then the drill string 100 is lifted by the draw-works 11 at the surface until the tensile pull force is high enough to shear the shear pins 149. As shown in FIG. 16, this allows the coupling member 142 and the carriage 138 to which it is threadedly attached to move upstream, (to the left) relative to the inlet section 147 of the stator housing 108 until the upstream end of the carriage 138 engages abutment 151 on the inlet section 147 of the stator housing 108. At the same time the carriage 138 withdraws the retaining pins 137 so that their free extremities lie within the cover plate 124. This allows the torsion springs 128 to pivot the pawls 116 into their operative position in the recesses 115.

Failure of the shear pins 149 may be detected by a sensor in the MWD (if it is still operational after jarring), noting a change in the tension in the drill string at the surface, noting movement of the drill string 100 at the surface or, ultimately, applying the appropriate force at the draw-works 111 and assuming that the shear pins 149 have failed at their designed failure shear force.

In any event, once the pawls 116 are believed to be in their operative position the drill string 102 is rotated clockwise at the surface 102. Despite their robust construction a drill string 100 acts to some extent like an elastic band and eventually the twisting at the surface 102 reaches the coupling member 142 which transmits the torque to the inlet section 147 of the stator housing 108 via the splines 145 and 146. The coupling member 142 applies the torque to the annular mounting block 118 which in turn applies it to the inlet coupling 114 and thus to the rotor shaft 106 via the pawls 116 and thence to the drill bit 104 which may, or may not, break free. At the same time the drill-string could also be pulled in tension from surface.

As mentioned above, if the drill bit 104 does break free, then the entire drill string 100 would normally be tripped out and new components tripped in to resume drilling whilst the recovered components are serviced, refurbished or discarded as necessary. Having said this it will be appreciated that drilling could continue by rotating the drill string 100 from the surface and/or pumping mud to the downhole motor 107 as the pawls 116 will allow rotation of the rotor assembly 106 relative to the stator housing 108 in the drilling direction. This is not ideal but offers a clear advantage where the drill bit 104 may have become stuck close to the terminal position of the bore or commercial considerations simply make tripping a non-option.

As mentioned above, reliance is placed on the shear pins 149 failing at that their design load.

Figure 18:
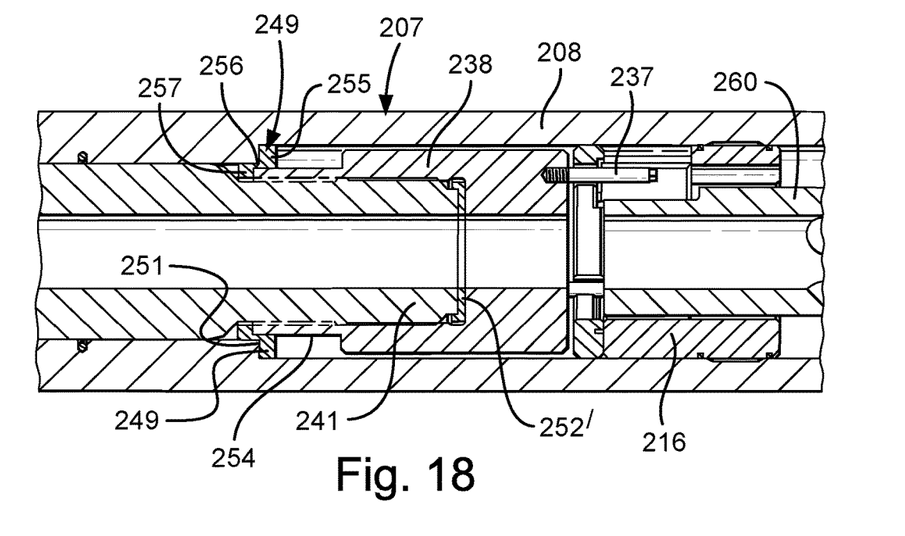
FIG. 18 is section similar to the section of FIG. 13 but showing a different shearing arrangement using an annular shear ring.

Rather than use shear pins 149, a different shear member might be used, such as a shear ring 249 in FIG. 18.

Such an arrangement and modifications to associated parts are shown in FIGS. 18 to 22 in which parts having similar functions to those shown in FIGS. 1 to 17 have been identified by similar reference numerals but in the '200' series.

The main difference is that the shear pins 149 have been replaced with a shear ring 249 which is formed as one piece but which comprises an inner ring 257 and an outer ring 255 which are offset from one another and connected by a relatively thin ring 256 which is designed to shear at the desired force. The inner ring 257 is sized to fit about threaded tip 241 and within the bore of stator housing 208. The outer ring 255 is sized to fit about a reduced diameter portion of the carriage 238 and abuts shoulder 251.

Figure 19:
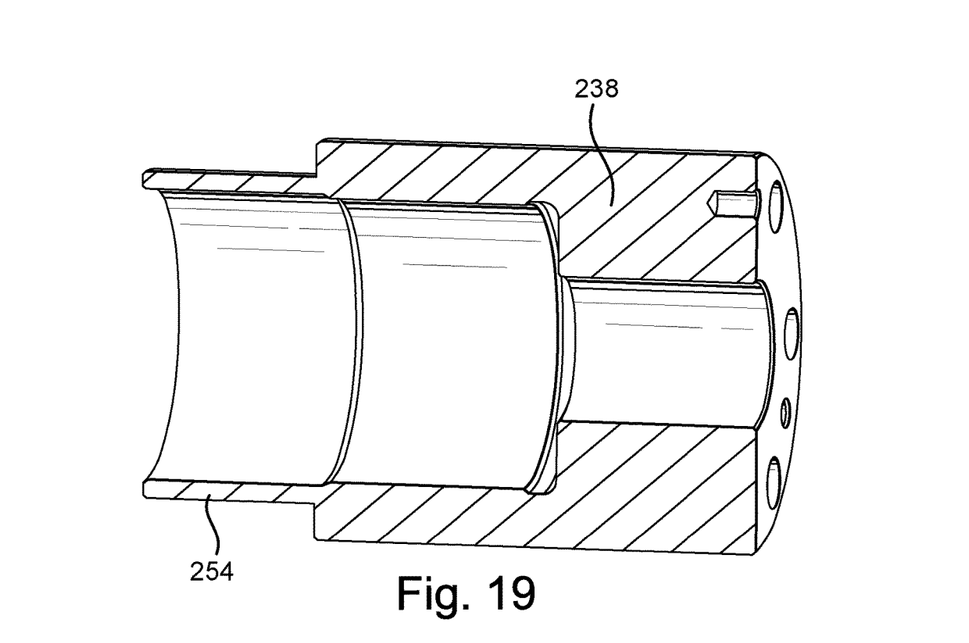
FIG. 19 is a cross section through a carriage forming part of the retaining pin withdraw mechanism shown in FIG. 18.
Figure 20:
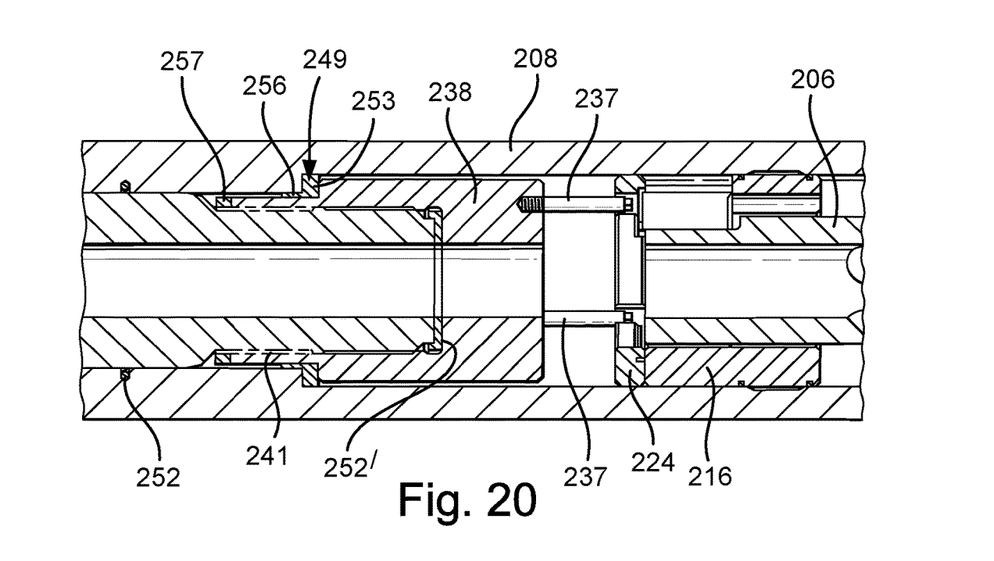
FIG. 20 shows the relative positions of the components shown in FIG. 18 after the shear ring has sheared.

As shown in FIG. 19, the carriage 238 differs from the carriage 138 in that it includes an annular extension 254 the upstream extremity of which bears against the inner ring 257 of the shear ring 249 as shown in FIG. 18.

Figures 21, 22:
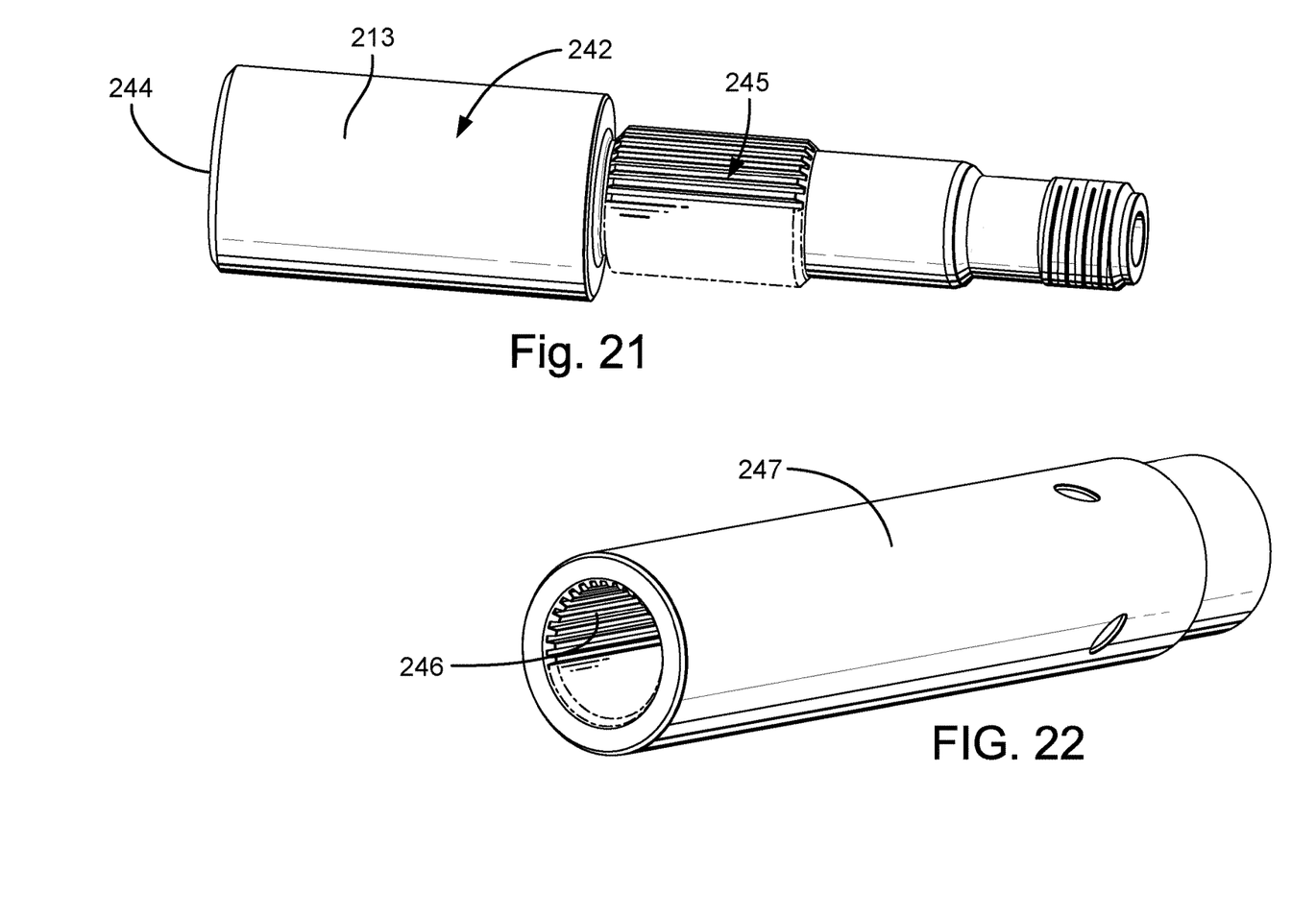
FIG. 21 is a side elevation of a coupling member for use with the arrangement shown in FIGS. 18 to 20.
FIG. 22 is a perspective view of an inlet section of the housing of the downhole motor for use with the arrangement shown in FIGS. 18 to 21.

As shown in FIG. 21, the coupling member 242 has a splined section 245 but there are no blind bores 148 as this embodiment does not utilize shear pins.

Similarly, in FIG. 22 there are no threaded bores 150 for the same reason where the shear pins were located. There are still holes for locating plugs which are also used in this alternative design.

100 Drill string
101 Drill pipe
102 Surface
103 Drill Collars
BHA Bottom Hole Assembly
104 Drill Bit
105 Heavy Weight Drill Pipe
106 Rotor assembly
107 Downhole Motor
108 Stator Housing
109 MWD Unit
110 Drilling Jar
111 Safety Joint
111' Drawworks
112 Sub
113 Vanes
114 Inlet coupling
115 Recesses
115' Shoulder
116 Pawls
117 Sprag clutch assembly
118 Annular mounting block
119 Cut-out
119' Planar Axial Surface
119" Curved axialsurface
120 Threaded Axial Hole
121 Channels
122 Locating plug receiving recesses
123 Threaded Holes
124 Cover plate
125 Axial Holes
126 Holes
127 Coiled body portion
128 Torsion spring
129 Channel
130 One end
131 Cut out
132 Retaining pin guide channels
133 Socket cap screws
134 Channel
135 Pivot pin
136 Locating plugs
137 Retaining pins
138 Carriage
140 Downstream face
141 Threaded tip
142 Coupling member
143 Upstream section
144 Threaded inlet box
145 Splined section
146 Splines
147 Inlet section
148 Blind bores
149 Shear pins
150 Threaded bores
151 Abutment
152 Seal
153 O-ring seal
238 Carriage
245 Splined section
249 Shear Ring
238 Carriage
241 Threaded tip
245 Splined section
249 Shear Ring
251 Shoulder
255 Outer ring
256 Relatively thin ring
257 Inner ring
254 Annular extension
255 Outer ring
256 Relatively thin ring
257 Inner ring

The invention claimed is:

1. A downhole motor, comprising:
a stator housing;
a rotor assembly rotatable relative to the stator housing;
a unidirectional clutch assembly disposed between the rotor assembly and the stator housing and having at least one pawl actuatable between an inoperative position adjacent said stator housing and an operative position in which rotation of the stator housing by the drill string is transmitted to the rotor assembly via the at least one pawl;

a spring coupled to the clutch assembly and configured to bias the at least one pawl towards the operative position;

a retaining pin configured to retain the at least one pawl in the inoperative position; and a shear member coupled to the stator housing and configured to cause the retaining pin to release the at least one pawl and enable the at least one pawl to move into the operative position in response to the application of a pulling force to the drill string.

2. The downhole motor of claim 1, wherein the downhole motor comprises a turbodrill.

3. The downhole motor of claim 1, wherein the downhole motor comprises a vane hydraulic motor having a rotor shaft assembly which rotates concentrically within the stator housing.

4. The downhole motor of claim 1, wherein the at least one pawl is pivotally mounted to the clutch assembly.

5. The downhole motor of claim 1, wherein the clutch assembly comprises an annular mounting block disposed circumjacent the rotor assembly.

6. The downhole motor of claim 5, wherein said at least one pawl is pivotally mounted on said annular mounting block.

7. The downhole motor of claim 5, wherein said spring is configured to act between said at least one pawl and at least one of said annular mounting block and said housing.

8. The downhole motor of claim 1, wherein the retaining pin is mounted on a carriage movable relative to the stator housing to displace the retaining pin and allow the at least one pawl to move into the operative position.

9. The downhole motor of claim 8, wherein the carriage is held in position by the shear member, and wherein the shear member is shearable to allow movement of the carriage in response to the application of the pulling force to the drill string.

10. The downhole motor of claim 1, wherein the clutch assembly comprises a sprag clutch.

11. The downhole motor of claim 10, wherein the sprag clutch is configured to apply torque from surface at the same time as the drill-string is either pulled in tension or put into compression by slacking off string weight.

* * * * *